United States Patent [19]

Karnowski

[11] Patent Number: 5,907,596
[45] Date of Patent: *May 25, 1999

[54] CALLING PARTY IDENTIFICATION DEVICE WITH MESSAGE FUNCTION

[75] Inventor: Mark J. Karnowski, Huntington Beach, Calif.

[73] Assignee: Casio PhoneMate, Inc., Torrance, Calif.

[*] Notice: This patent is subject to a terminal disclaimer.

[21] Appl. No.: 08/602,003

[22] Filed: Feb. 15, 1996

[51] Int. Cl.$^6$ .................................................. H04M 1/64
[52] U.S. Cl. ........................................ 379/88.21; 379/142
[58] Field of Search .............................. 379/67, 88, 89, 379/142, 90.01, 93.05, 93.17, 93.24, 93.27, 67.1, 88.21, 88.19, 88.22, 88.23, 355; 340/825.44, 825.48

[56] References Cited

U.S. PATENT DOCUMENTS

| Re. 31,789 | 1/1985 | Kashimoto | 379/142 |
|---|---|---|---|
| 4,582,956 | 4/1986 | Doughty | 379/142 |
| 4,623,758 | 11/1986 | Batla et al. | 379/80 |
| 4,942,598 | 7/1990 | Davis | 379/67 |
| 4,961,216 | 10/1990 | Baeher et al. | 379/67 |
| 5,111,500 | 5/1992 | Ashfar et al. | 379/67 |
| 5,128,980 | 7/1992 | Choi | 379/88 |
| 5,327,486 | 7/1994 | Wolff et al. | 379/142 |
| 5,390,236 | 2/1995 | Kluasner et al. | 379/67 |
| 5,561,703 | 10/1996 | Arledge et al. | 379/57 |
| 5,574,771 | 11/1996 | Driessen et al. | 379/57 |
| 5,581,593 | 12/1996 | Engelke et al. | 379/52 |
| 5,604,492 | 2/1997 | Abdul-Halim | 340/825.44 |
| 5,604,791 | 2/1997 | Lee | 379/67 |
| 5,661,783 | 8/1997 | Assis | 379/67 |
| 5,668,852 | 9/1997 | Holmes | 379/142 |

OTHER PUBLICATIONS

Copy of an article from "Telecommunications" entitled New Telegenies Calling describing Caller ID Products.
Brochure of Fans Telecom, Inc., Scottsdale, Arizona, describing Caller ID Products, Jan., 1995.

Design Manual from Texas Instruments TSP50C10/11 Speech Synthesizer, Linear Products, Mar. 1990.

*Primary Examiner*—Scott Weaver
*Attorney, Agent, or Firm*—Frishauf, Holtz, Goodman, Langer & Chick

[57] ABSTRACT

A caller identification device attachable to a telephone line and having a message function includes a line interface coupled to the telephone line, a ring detector for detecting rings of an incoming telephone call, and a line monitor for receiving an incoming telephone call signal from the telephone line in an on-hook state. A caller identification detector is coupled to the line monitor for detecting caller identification information including at least the caller's telephone number when the line monitor receives an incoming telephone call signal. A speech synthesizer generates and transmits speech signals on the telephone line, and a remote detector is coupled to the line monitor for detecting a remote command tone signal. A controller activates the line interface to seize the telephone line when the ring detector detects rings of an incoming telephone call. The controller enables recording of the caller identification information detected by the caller identification detector, and causes the speech synthesizer to generate and transmit to the caller a menu of spoken options prompting the caller to enter a remote command tone signal corresponding to a message when the line interface seizes the telephone line. The message corresponding to the remote command tone signal entered by the caller and detected by the remote detector is recorded. The controller may optionally control dialing of a service such as a pager service, to transmit caller identification information and, if applicable, a message, to the pager service.

17 Claims, 3 Drawing Sheets

CALLING PARTY IDENTIFICATION DEVICE WITH MESSAGE FUNCTION

BACKGROUND OF THE INVENTION

The present invention relates generally to caller identification devices, and more particularly, is directed to a caller identification device with a message function.

In conventional work environments, most telephone messages are manually recorded by a secretary on a pre-printed "while you were out" message slip having a format which includes spaces for writing the caller's name, telephone number, and a simple message such as "telephoned", "returned your call", etc. Such pre-printed message slips allow a secretary to quickly transcribe messages with little effort.

With the advent of calling party identification (CPID) services now available, most of the information needed for the "while you were out" message slip is automatically available. Specifically, currently sold devices allow the caller's name and telephone number to be displayed while the telephone rings. If the caller identification device has memory, the names of recent callers can be recalled at a later time.

However, such caller identification devices do not provide any additional information that indicates the caller's intentions. Accordingly, a caller identification device is not sufficient to replace the "while you were out" message slips.

U.S. Reissue Pat. No. 31,789 to Hashimoto discloses a device for displaying a caller's telephone number while the telephone is ringing. Although Hashimoto does disclose providing the device with an electronic printer in order to print out a record of the telephone numbers of calls received while the owner of the device is absent, there is no disclosure of using the device to relay messages from the caller to the owner.

U.S. Pat. No. 4,582,956 to Doughty discloses a method and apparatus for displaying CPID information at a called telephone station during the silent interval between ringing. Doughty describes an apparatus that can be used to receive alphanumeric messages from a caller, but these messages are not stored. Rather, these messages are only displayed during the silent interval.

Further, various devices have recently been provided for sending the caller's number from a caller identification device to a pager unit. However, again, only the caller's number is known, and additional messages are not provided. One such device is sold by Brother under the trademark "TeleGenie". Another such device is sold by Fans Telecom, Inc. under the trademark "FANS". In the latter device, there is an additional function in which a secretary can press a button to inform the owner of the device, through his or her pager, to call the office. However, there is no provision for a caller to leave a message by means of a caller identification device.

SUMMARY OF THE INVENTION

Accordingly, it is an object of the present invention to provide a caller identification device with a message function.

It is another object of the present invention to provide a caller identification device with a message function akin to a conventional message slip, while adding little cost to a basic caller identification device.

It is still another object of the present invention to provide a caller identification device with the capability of answering a telephone call, providing a voice-synthesized menu of message options to the caller, and displaying a message of the caller in addition to the caller's name and telephone number.

It is yet another object of the present invention to provide a caller identification device with a message function wherein a message of the caller can be displayed on a liquid crystal display (LCD) or transmitted to the owner of the device via a portable pager.

In accordance with the above objects, the present invention comprises a caller identification device attachable to a telephone line and having a message function. The device includes a line interface coupled to the telephone line, a ring detector coupled to the telephone line for detecting rings of an incoming telephone call, and a line monitor coupled to the telephone line for receiving an incoming telephone call signal (which can be caller ID information, or DTMF signals or the like) from the telephone line in an on-hook state. The device further includes a caller identification detector, coupled to the line monitor, for detecting caller identification information including at least the caller's telephone number when the line monitor receives an incoming telephone call signal, and a speech synthesizer coupled to the line interface for generating and transmitting speech signals along the telephone line. The device still further includes a remote detector coupled to the line monitor for detecting a remote command tone signal. A controller is provided for controlling the line interface to seize the telephone line when the ring detector detects rings of an incoming call. Prior to the line interface seizing the telephone line, the controller controls recording of the caller identification information detected by the caller identification detector. The controller also causes the speech synthesizer to generate and transmit to the caller a menu of spoken options prompting the caller to enter a remote command tone signal corresponding to a message when the line interface seizes the telephone line, and records the message corresponding to the entered remote command tone signal detected by the remote detector.

The above and other objects, features and advantages of the invention will become readily apparent from the following detailed description which is to be read in conjunction with the accompanying drawings.

DETAILED DESCRIPTION

The present invention relates to calling party identification (CPID) devices, and more particularly, to a caller identification device that, in addition to storing the caller's name and telephone number, will prompt the caller to enter a number that corresponds to a particular message. The caller enters the number using the keypad of the telephone from which he is calling. The owner of the caller identification device, upon his or her return, can then retrieve the caller's name, telephone number and the general nature of the call.

Most caller identification devices have certain components, namely a ring detector, a caller identification modem, a liquid crystal display (LCD) to display the name and number of the caller, and some kind of controller that contains random access memory (RAM) to store identification information for later recall. The present invention adds a speech synthesizer and a dual tone multi-frequency (DTMF) receiver to the basic caller identification device to provide enhanced usability. The controller, the RAM and the speech synthesizer may be combined into a single integrated circuit (IC), such as the TSP50C10/11 chip manufactured by Texas Instruments.

Figure 1:
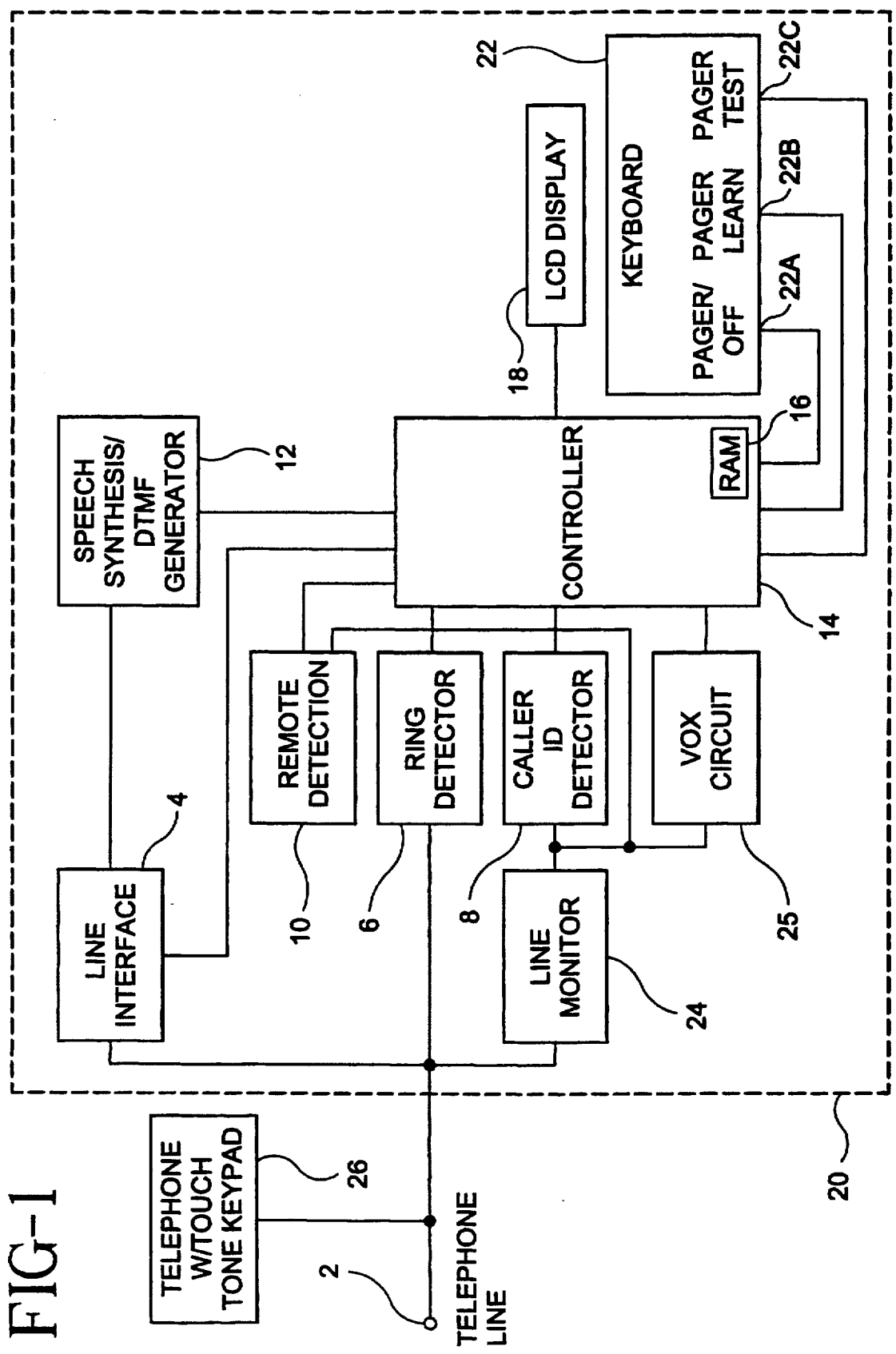
FIG. 1 is a block diagram of a caller identification device in accordance with one embodiment of the present invention.

Referring to the drawings, and initially to FIG. 1 thereof, a caller identification device 20 according to one embodiment of the present invention is connected in parallel with a telephone 26 to a telephone line 2. Alternatively, device 20 could be incorporated into a specially designed telephone (not shown).

Telephone line 2 is coupled to a line interface circuit 4, a ring detector 6 and a line monitor 24, all part of caller identification device 20. Ring detector 6 monitors telephone line 2 for the detection of ringing signals sent from a telephone company central office. Line monitor 24 is a high input impedance circuit that allows device 20 to monitor telephone line 2 without being in an off-hook state.

In this regard, line monitor 24 is coupled to a caller identification detector 8 which is used to detect information about the caller, that is, the caller's name and telephone number. Line monitor 24 is further coupled to a remote detector 10, and allows remote detector 10 to detect DTMF tones on the telephone line 2 that are entered by a caller. Moreover, the output port of line monitor 24 and the input port of caller identification detector 8 are coupled to the input port of VOX circuit 25. The output port of VOX circuit 25 is coupled to controller 14.

Line interface circuit 4 is coupled to a speech synthesis/DTMF generator 12 which is used to play a message to the caller (described in more detail hereinbelow) after a certain number of rings have gone unanswered.

A controller 14 of device 20 controls or monitors the operations of line interface circuit 4, ring detector 6, caller identification detector 8, remote detection circuit 10, speech synthesis/DTMF generator 12 and a keyboard 22.

In operation, controller 14 monitors ring detector 6, waiting for an incoming ring. When a ring occurs, the caller identification detector 8 detects CPID information, that is, the caller's name and telephone number. This information is stored in a RAM 16 coupled to controller 14, and is displayed on a LCD 18. If a predetermined number of rings, such as four, occurs with no answer, controller 14 commands line interface circuit 4 to seize telephone line 2, and then instructs speech synthesis/DTMF generator 12 to play a message on telephone line 2. This message instructs the caller to enter a number, that is, a DTMF tone corresponding to the option that the caller wishes to select.

For example the message could state:

"Hello, you have reached 618 9910.

Enter 1 if you want to be called back

Enter 2 if you are returning my call

Enter 3 if you want to arrange a meeting

Enter 4 if you want to call again

Enter 5 if the issue is urgent

Enter 6 to page me."

The caller can then enter a DTMF tone, using his or her telephone keypad, to choose a desired option or options.

Remote detection circuit 10 then detects the DTMF tone entered by the caller and sends it to controller 14 which implements the command. The remote detection circuit 10 can be provided with a voice signal detector in addition to or in place of a DTMF tone detector. The information obtained from the caller would then be indicated on the LCD display 18.

Depending on the options chosen, further information may be solicited. For example, if the caller entered a DTMF tone 3 corresponding to option 3 above, speech synthesizer/DTMF generator 12 would prompt the caller to enter the month, date and time of the proposed meeting.

In order to implement option 6 above, moreover, speech synthesis/DTMF generator 12 pages the owner of the device 20 and transmits the number that was obtained by the caller identification operation. Thus, if the command is to page the owner of the unit, speech synthesis/DTMF generator 12 sends the caller's telephone number to the owner's pager unit via a pager service. (The telephone number of the owner's pager service would have been previously programmed into device 20.) In such case, LCD 18 displays the information obtained from the caller via the DTMF tone as well as the caller's name and telephone number. The owner of device 20 can then obtain this information upon his or her return. If desired, as discussed below, the owner of device 20 has the option of disabling the paging feature by pressing a "Pager/Off" key.

Keyboard 22 is provided with at least the following three keys: Pager/Off key 22A, Pager Learn key 22B, and Pager Test key 22C. These keys allow device 20 to be programmed to page the owner of the device 20 and transmit CPID information to the owner's paging device.

Pager Learn key 22B is pressed when the owner wants to program his or her pager number into device 20. After pressing Pager Learn key 22B, the owner then takes off-hook any telephone 26 which is connected to the same telephone line 2 as device 20, and dials his or her pager service on the touch tone keypad of telephone 26. After the owner's pager service has answered and prompts him to enter the telephone number to be displayed, the owner then presses a predetermined series of keys (such as * * *) to end the learning process. Controller 14 stores the telephone number of the pager service in memory 16 as well as the duration of the pauses between the dialed digits and the predetermined series of keys. The predetermined series of tones that are entered after the owner's pager number instruct controller 14 to pause and then cause the speech synthesis/DTMF generator 12 to transmit a caller's telephone number obtained from caller identification detector 8, as described above, via the pager service to the owner's pager unit. With regard to the pager feature, use can be made in the present invention of the pager system disclosed in copending U.S. application Ser. No. 08/588,123 filed Jan. 18, 1996 (inventor: Mark J. Karnowski), now U.S. Pat. No. 5,761,271, and assigned to the same assignee as the present application, the entire contents of which are incorporated herein by reference.

Pager Test key 22C allows the owner to test the device after his pager number has been programmed into it. Controller 14 accesses the pager service and then transmits a predetermined test code, such as "123", via the speech synthesis/DTMF generator 12 to the owner's pager. In this manner, the owner can be assured that device 20 is programmed correctly.

Pager/Off key 22A allows the owner to selectively set the device to forward all calls to his pager. When device 20 is set to Pager mode, every time a telephone call is received, CPID information will be transmitted to the owner's pager. When the Pager mode is turned off by pressing the Pager/Off key 22A, only CPID information of those caller's that select the "page" option 6 from the synthesized voice menu will be transmitted to the owner's pager.

Figure 2:
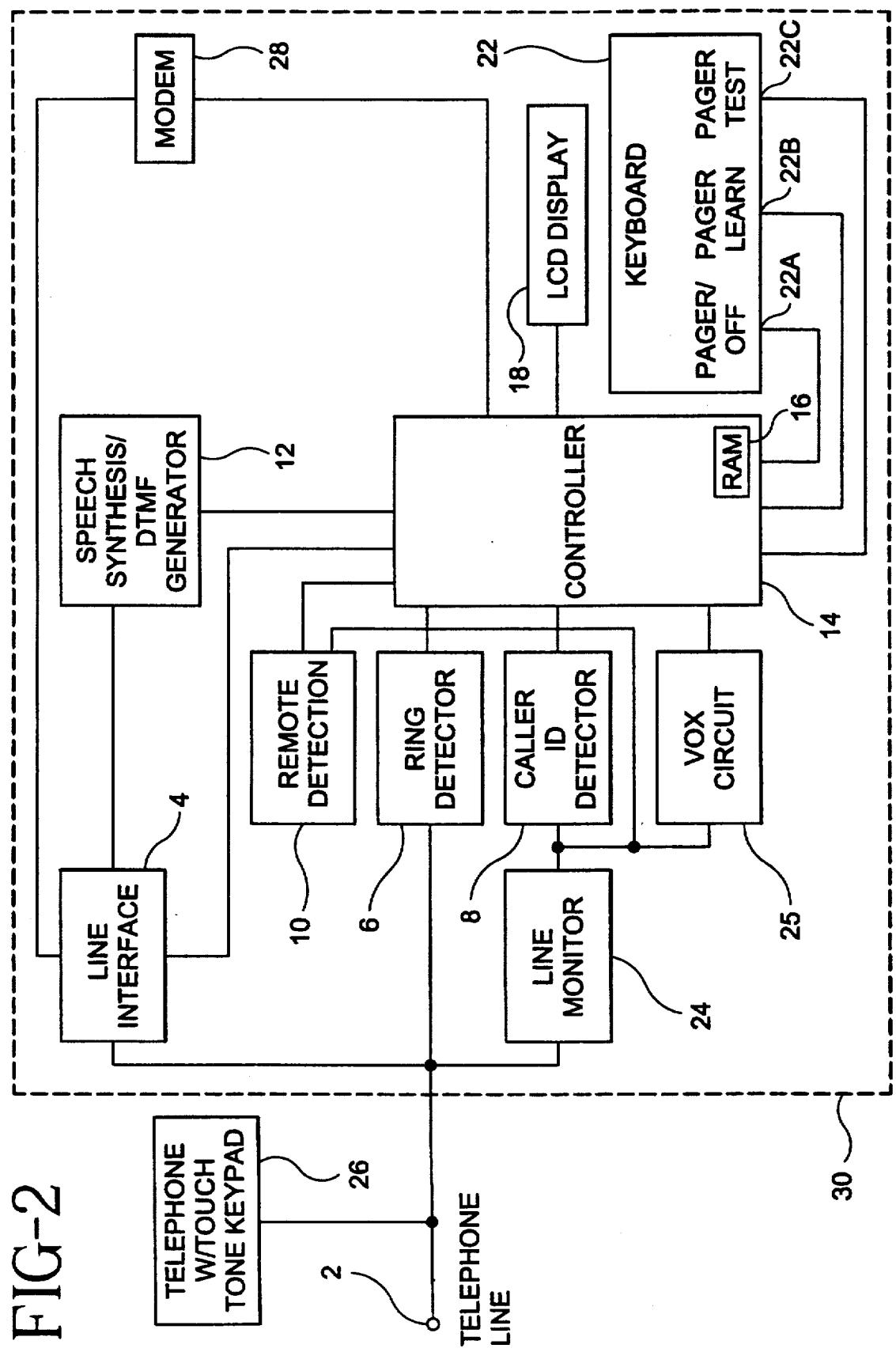
FIG. 2 is a block diagram of a caller identification device in accordance with another embodiment of the present invention.

Further, many services now exist that send alphanumeric data to a portable pager. These services allow a modem-equipped device to contact the pager service and transmit alphanumeric information to an alphanumeric pager. Thus, referring to FIG. 2, a caller identification device 30 in accordance with another embodiment of the present invention is shown. Elements corresponding to those of FIG. 1 are identified by the same reference numerals and a detailed description of the common elements will not be described for the sake of brevity. According to this embodiment, a modem 28 is coupled between controller 14 and line interface 4, and device 30 can transmit the name, telephone number and a message of a caller, such as "CALL BACK", to a pager via modem 28, in response to a caller's responses.

Figure 3:
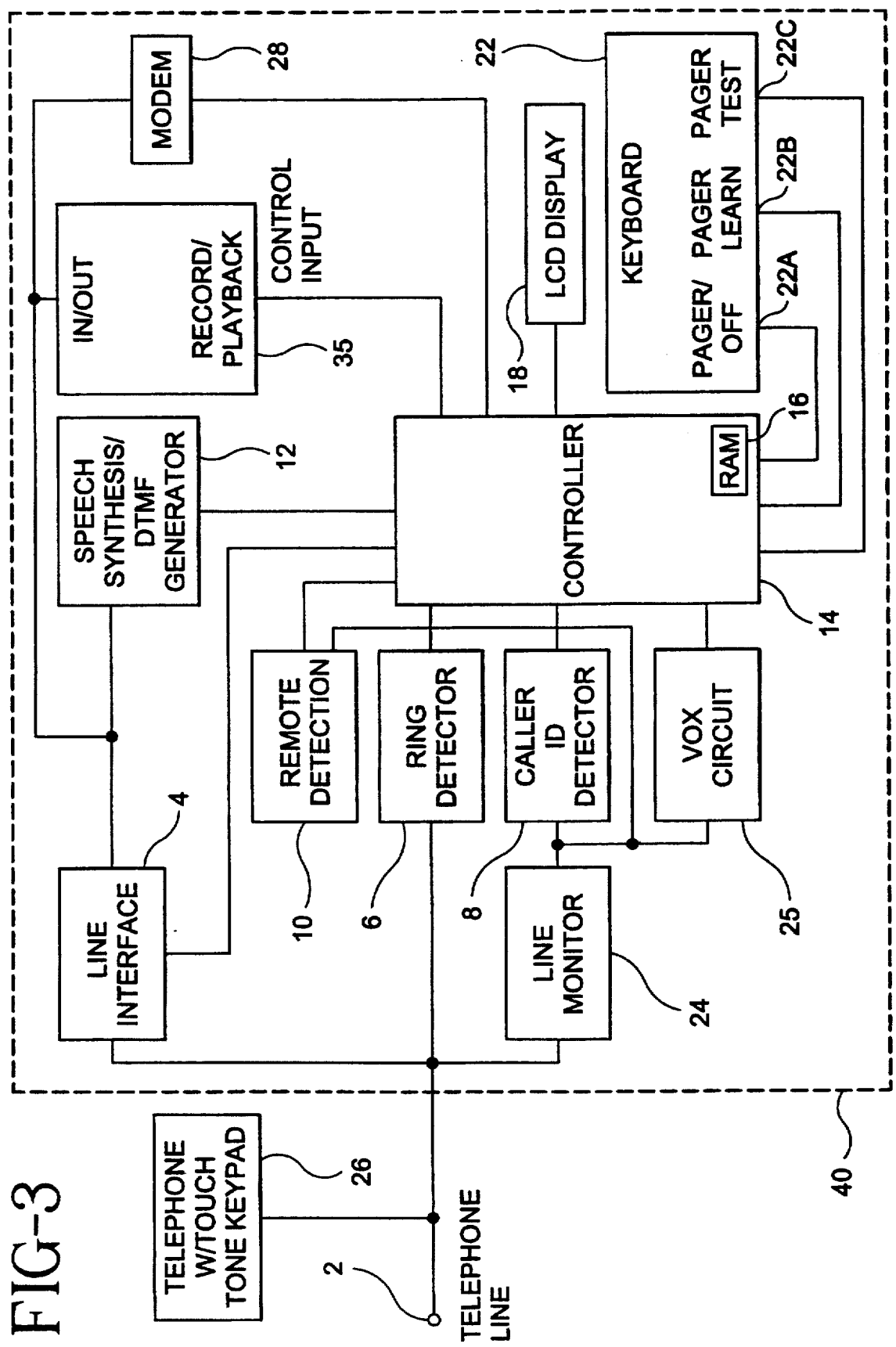
FIG. 3 is a block diagram of a caller identification device in accordance with still another embodiment of the present invention.

Referring to FIG. 3, a caller identification device 40 in accordance with still another embodiment of the present invention is shown. Again, elements corresponding to those of FIG. 1 are identified by the same reference numerals and a detailed description of the common elements will not be described for the sake of brevity. According to this embodiment, a record/playback unit 35 is coupled between controller 14 and line interface 4. In this regard, caller identification device 40 is integrated into a telephone answering device (TAD). In this embodiment, the synthesized voice menu can be replaced by the owner's recorded greeting. When set to Pager mode by Pager/Off key 22A, the TAD transmits CPID information to the owner's pager every time a call is received, whether or not the caller leaves a message on record/playback unit 35. When the Pager mode is turned off by means of Pager/Off key 22A, the TAD records messages as usual. A modem 28 can be optionally added between the controller 14 and the line interface 4, and works in the same manner as discussed above with reference to FIG. 2.

Having described specific preferred embodiments of the invention with reference to the accompanying drawings, it will be appreciated that various modifications thereto can be effected by one of ordinary skill in the art without departing from the scope or spirit of the invention.

What is claimed is:

1. A caller identification device comprising:

a line interface circuit coupled to a telephone line;

a ring detector coupled to the telephone line, the ring detector detecting rings of an incoming telephone call, wherein said line interface seizes the telephone line when the ring detector detects a predetermined number of rings of the incoming telephone call;

a line monitor coupled to the telephone line, the line monitor receiving an incoming telephone call signal from the telephone line while in an on-hook state;

a dual tone multi-frequency generator coupled to the line interface circuit for generating dual tone multi-frequency signals on the telephone line;

a VOX circuit coupled to the line monitor, the VOX circuit automatically detecting a presence of audible signals on the telephone line;

a memory storing at least numeric information and at least one identifier representing a detection by the VOX circuit of the presence of audible signals on the telephone line;

a caller identification detector coupled to the line monitor, the caller identification detector detecting caller identification information including at least a telephone number of a caller when the line monitor means receives the incoming telephone call signal; and a controller which controls the line interface circuit to re-seize the telephone line in response to a completed telephone call in which the caller identification detector has detected the caller identification information, for subsequently controlling the dual tone multi-frequency generator to dial a predetermined telephone number that is stored in the memory, and for then controlling the dual tone multi-frequency generator to transmit said at least numeric information over the telephone line, wherein transmission of said at least numeric information by the controller is paused until the VOX circuit ceases to detect the presence of audible signals on the telephone line for a predetermined period of time each time the at least one identifier is encountered.

2. The device of claim 1, further comprising a display device which displays the at least numeric information.

3. The device of claim 2, wherein said display device comprises a liquid crystal display.

4. The device of claim 1, wherein said predetermined telephone number is a pager service telephone number.

5. The device of claim 1, further comprising a keyboard coupled to the controller, the keyboard comprising a first user actuated key which enables a user to program the device so that the controller controls the dual tone multi-frequency generator to dial the predetermined telephone number in response to a completed telephone call in which the caller identification detector has detected caller identification information and to subsequently transmit the at least numeric information over the telephone line.

6. The device of claim 5, wherein, in response to activation of the first user actuated key, the user programs the device by dialing digits on a parallel connected telephone.

7. The device of claim 5, wherein the keyboard further comprises a second user actuated key which enables the user to test the device after the device has been programmed, said test comprising said controller controlling the dual tone multifrequency generator to dial the predetermined telephone number in response to actuation of the second user actuated key and to further transmit a predetermined test series of digits over the telephone line, wherein transmission of the predetermined test series of digits by the controller is paused until the VOX circuit ceases to detect the presence of audible signals on the telephone line for a predetermined period of time each time the at least one identifier is encountered.

8. The device of claim 1, further comprising a modem coupled between the controller and the line interface, and wherein the controller further controls the modem to transmit the at least numeric information to a service having the predetermined telephone number.

9. The device of claim 1, further comprising a recording and playback unit for recording and playing back a spoken message of the caller.

10. The device of claim 9, wherein the recording and playback unit records and plays back an outgoing message of the user of the device, and wherein the controller controls the recording and playback unit to play back the outgoing message when the line interface seizes the telephone line.

11. The device of claim 1, further comprising:

a speech synthesizer coupled to the line interface circuit which generates speech signals and transmits the speech signals along the telephone line;

a remote detector coupled to the line monitor which detects a remote command tone signal corresponding to a message indicating additional information, wherein the caller is prompted to enter said remote command tone signal in response to said speech signals, and the message indicating additional information is stored in the memory.

12. The device of claim 5, further comprising an integrated telephone with a touch tone keypad coupled to at least said controller.

13. The device of claim 12, wherein, upon actuation of the first user actuated key, the user programs the calling party identification device by dialing digits on the touch tone keypad of the integrated telephone.

14. The device of claim 13, wherein the memory stores the dialed digits along with information representing pauses and audible activity present on the telephone line during programming.

15. The device of claim 6, wherein the memory stores the dialed digits along with information representing pauses and audible activity present on the telephone line during programming.

16. The device of claim 7, wherein said keyboard further comprises a user third actuated key for alternately enabling and disabling the dual tone multi-frequency generator, thereby alternately enabling and disabling the ability of the device to dial the predetermined telephone number in response to the completed telephone call in which the caller identification information is detected by the caller identification detector.

17. The device of claim 1, wherein the line monitor coupled to the telephone line comprises a high impedance circuit.

* * * * *